Oct. 25, 1966  W. A. AHERN  3,281,113
BEARING MEANS FOR DAMPER BLADE SUPPORTING SHAFTS
Filed Feb. 14, 1963  2 Sheets-Sheet 1
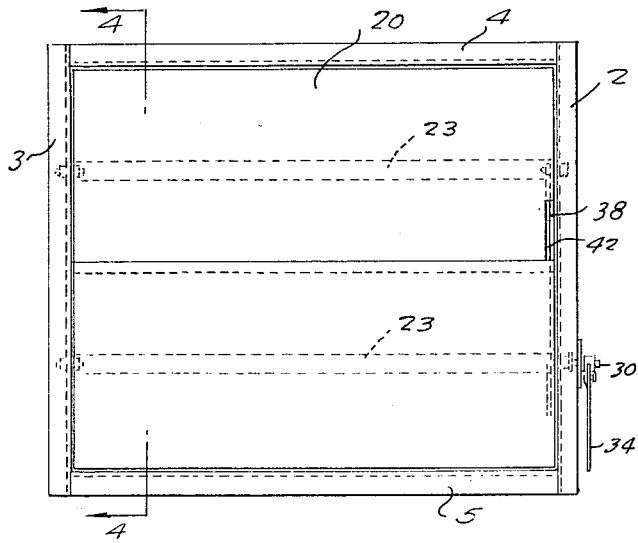
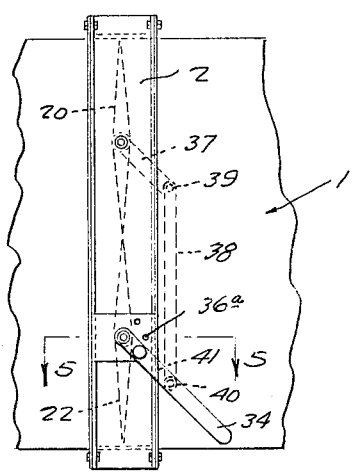
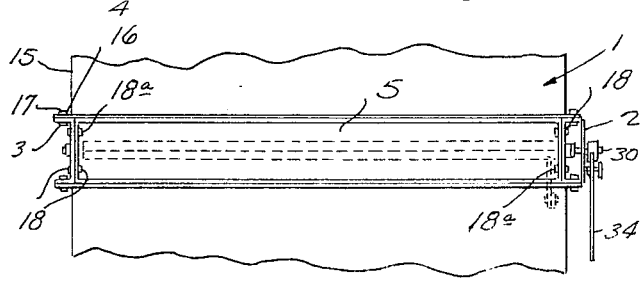
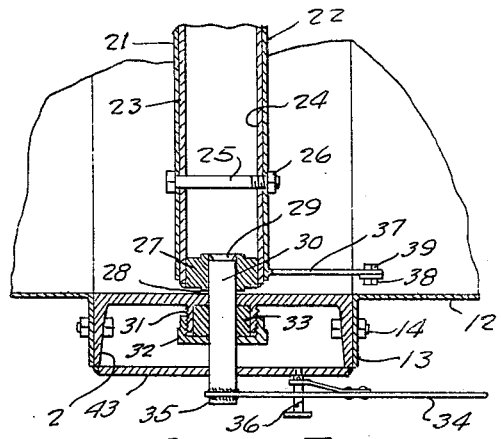
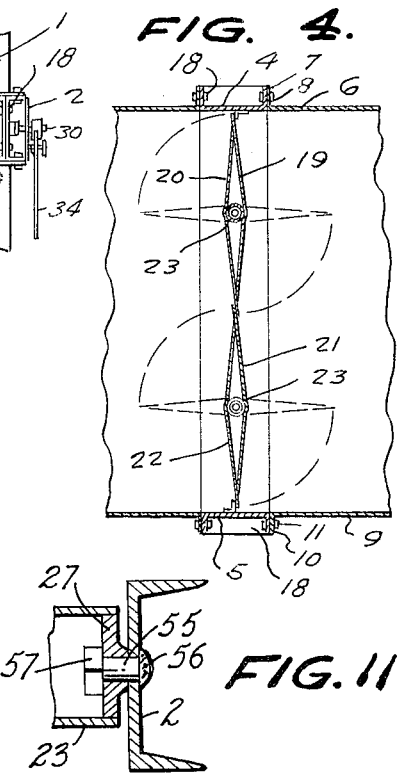
INVENTOR.
WILLIAM A. AHERN,
BY
ATTORNEY

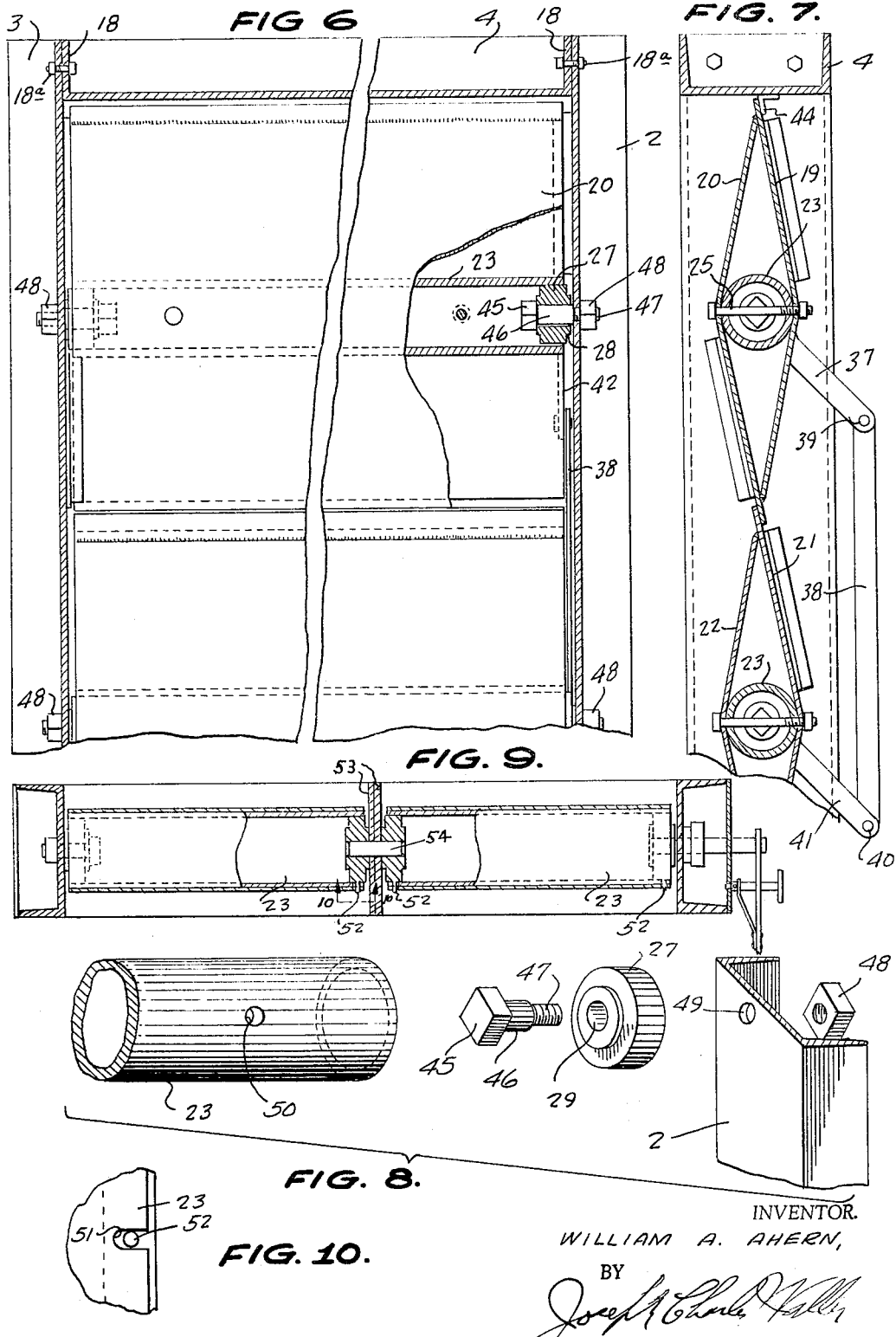

United States Patent Office 3,281,113
Patented Oct. 25, 1966

3,281,113
BEARING MEANS FOR DAMPER BLADE
SUPPORTING SHAFTS
William A. Ahern, 146 Kingston Blvd., Island Park,
Long Island, N.Y.
Filed Feb. 14, 1963, Ser. No. 258,486
3 Claims. (Cl. 251—308)

The present invention is concerned with an improvement in gas and air duct dampers and is particularly directed to leak proof bearings for such dampers.

The principal object of the invention is to provide dampers for ducts conveying gas or air under pressure and bearings for such dampers which bearings do not permit the leakage of the air or gas thereby, enable the dampers to be more easily operated than known dampers, and which advantages are obtained in a structure more economically produceable than structures obtainable heretofore.

Further objects of the invention will be in part pointed out and in part obvious from the following description of the accompanying drawings, in which:

FIG. 1 is an end view of a damper according to the present invention.

FIG. 2 is a side view of the damper as mounted in a duct which is partially shown.

FIG. 3 is a bottom elevation of the damper and portions of a duct containing the same.

FIG. 4 is a cross-sectional view taken on line 4—4 of FIG. 1.

FIG. 5 is an enlarged detailed sectional view taken on line 5—5 of FIG. 2.

FIG. 6 is an enlarged detailed partial cross-sectional view of a modified form of damper.

FIG. 7 is also an enlarged detailed partial cross-sectional view of the modified damper taken at right angles to FIG. 6.

FIG. 8 is an exploded further enlarged detailed view of a bearing forming part of said modified damper.

FIG. 9 is a cross-sectional view of a double duct and damper in accordance with the present invention.

FIG. 10 is an enlarged detailed view of a bearing and blade connection.

And FIG. 11 is a cross-sectional view of a modified form of the bearing retaining means.

Referring now more particularly to the accompanying drawing wherein like and corresponding parts are designated by similar reference characters, numeral 1 generally designates a conventional air or gas sheet metal duct, such as for example those used in large steam power generating plants and which duct usually has a rectangular or square cross-sectional configuration.

Numeral 2 indicates a channel member forming one side of the duct, while the opposite side channel member is indicated at 3, and the top and bottom channel members connecting side members 2 and 3 are indicated at 4 and 5 respectively.

The top 6 of duct 1 has a flanged end 7 abutting top member 4 and connected thereto by bolt 8. Similarly bottom 9 of said duct has a flanged end 10 abutting bottom member 5 and connected thereto by bolts 11. Duct side 12 has flanged end 13 abutting and connected to side member 2 by bolts 14. Opposite duct side 15 has flanged end 16 connected by bolts 17 to damper side member 3. Said duct is connected in a similar manner to the opposite end of said damper members as shown in the drawings so that said damper is interposed in said duct.

Said damper top and bottom members 4 and 5 have upright ends 18 connected by bolts 18a to side members 2 and 3 providing a completely closed frame which will not permit the leakage of air or gas from duct 1.

Plates 19, 20, 21 and 22 each have an open V-shaped configuration with plates 19 and 20 positioned on diametrically opposite sides of an upper tubular shaft 23 having bore 24 and connected thereto by bolts 25 extending therethrough and nuts 26 with the ends of said plates abutting forming a damper blade.

Similarly plates 21 and 22 are positioned on diametrically opposite sides of a second, but lower tubular shaft 23 and fastened thereto by bolts 25 extending therethrough and nuts 26 with the ends of plates 21 and 22 abutting forming a second damper blade having an edge overlapping and edge of the first blade.

Lower shaft 23 has a roller bearing 27 inserted in the end of bore 24 with said shaft welded to the periphery of said bearing. Said roller also has an annular shoulder 28 extending axially from said shaft bore abutting side member 2 and an axial bore 29. An operating shaft 30 extends into bore 29 and is welded to said bearing.

Shaft 30 also extends through an opening in side member 2 and through packing 33 of a stuffing box provided by tubular box 31 welded to side member 2 and having a cap 32 in threaded engagement therewith through which shaft 30 extends.

An operating lever 34 is fixedly connected at one end 35 in any conventional manner to shaft 30 while a spring loaded locking pin 36 is slidable through lever 34 and insertable in openings 36a in plate 43 welded to channel member 2 for locking lever 34 in various positions.

A lever 37 is fixedly connected at one end to upper shaft 23 and pivotally connected at 39 to bar 38 which bar in turn is pivotally connected at 40 to a second lever 41 fixedly connected to the lower shaft 23.

Plates 19, 20, 21 and 22 are spaced from side 2 as indicated at 42 in order that said plates can move past bar 38. A stop 44 is fixedly mounted on top member 4 to limit and seal the closing of the damper blades.

The opposite end of lower shaft 23 and both ends of the upper shaft 23 are supported by the modified form of bearing best shown in FIGS. 6 to 8. That is roller 27 has shoulder 28 loosely abutting the adjacent side member and can rotate within damper shaft 23 while positioned in the bore 24 of its shaft.

In lieu of operating shaft 30, a shoulder bolt 46 extends through bore 29 of roller 27 until head 45 loosely abuts said roller, and the shoulder 28 abuts the frame as the bolt extends through opening 49 in the side member which is indicated in FIG. 8 as member 2 by way of an example. A nut 48 threadedly engages threaded end 47 of said bolt drawing shoulder 28 tightly against side member 2 and encircling opening 49 providing a double seal leak proof support for shafts 23.

One of the openings in shafts 23 for bolts 25 is indicated in FIG. 8 at 50.

Shafts 23 can have end recesses 51, see FIG. 10, for receiving pins 52 radially carried by rollers 27 as a connection therebetween and to take care of differences in expansion of the parts and transmit motion through center or intermediate supports in a long damper, see FIG. 9, having double ducts separated by plates 53 connected to and extending between channel members 4 and 5 with stub axles 54 extending therethrough supporting rollers 27.

In the operation of the present damper, lever 34 is pivoted upon withdrawing pins 36 from openings 36a for rotating shaft 30 and thus roller 27 which is attached to and rotates lower shaft 23, actuating attached lever 41 through bar 38 and lever 37 moves upper shaft 23 to move the damper blades from their closed position to open positions as indicated in dotted lines in FIG. 4 or back to their closed position to control the passage of air or gas through duct 1.

It is to be appreciated that more or less damper blades can be employed than shown in the drawings and that shaft 30 can be employed at any end of any of the shafts 23 or the bearing arrangements rearranged to suit conditions as desired, and welding substituted for bolting in places to accomplish the same end. For example, as shown in FIG. 11 a stud 55 can be substituted for bolt 46 and welding 56 on the end of said stud in place of nut 48 for drawing the stud head 57 tightly against side member 2 and closing opening 49.

The present device is capable of considerable modification and such changes thereto as come within the scope of the appended claims is deemed a part of the invention.

I claim:

1. A bearing for damper blade supporting shafts comprising a damper frame having an opening, a tubular blade supporting shaft extending laterally of said damper frame, a ring shaped bearing fixedly mounted in an end of said shaft and having a ring shaped extension abutting said frame side around said frame opening and an elongated member extending through said bearing and said frame opening, and having a head abutting said bearing on a side thereof opposite to said frame and means on said elongated member on a side of said damper frame opposite to said bearing retaining said ring shaped extension abutting said frame and closing said frame opening.

2. A bearing as claimed in claim 1 wherein said elongated member is a flat headed shoulder bolt with said head abutting said bearing and said retaining means is a nut in threaded engagement with bolt on and drawn against a side of said frame opposite said bearing drawing said shoulder tightly against said frame in a leak proof manner.

3. A bearing as claimed in claim 1 wherein said elongated member is a flat headed shoulder bolt with said head abutting said bearing and said retaining means is a weld on said bolt and said frame on a side of said frame opposite said bearing around and closing said frame opening.

References Cited by the Examiner

UNITED STATES PATENTS

| | | | |
|---|---|---|---|
| 461,206 | 10/1891 | Goll | 251—306 |
| 1,300,590 | 4/1919 | Donald | 189—62 X |
| 1,818,050 | 8/1931 | Dow | 251—306 |
| 1,942,194 | 1/1934 | Wallgren | 308—36 |
| 2,516,537 | 7/1950 | Wetzel et al. | 308—36 |
| 2,759,574 | 8/1956 | Miller | 189—62 |
| 2,946,554 | 7/1960 | Asker | 251—306 |
| 3,055,284 | 9/1962 | Pellegrini | 98—110 |

FOREIGN PATENTS 1,255,873  1/1961  France.

WILLIAM F. O'DEA, *Primary Examiner.*

ISADOR WEIL, *Examiner.*

D. LAMBERT, *Assistant Examiner.*